(12) United States Patent
De Laet et al.

(10) Patent No.: US 10,920,873 B2
(45) Date of Patent: Feb. 16, 2021

(54) FIXING A PITCH TUBE

(71) Applicants: ZF Friedrichshafen AG, Friedrichshafen (BE); ZF Wind Power Antwerpen N.V., Lommel (BE)

(72) Inventors: Wim De Laet, Antwerp (BE); Bart Geudens, Retie (BE)

(73) Assignees: ZF Friedrichshafen AG, Friedrichshafen (DE); ZF Wind Power Antwerpen N.V., Lommel (BE)

( * ) Notice: Subject to any disclaimer, the term of this patent is extended or adjusted under 35 U.S.C. 154(b) by 0 days.

(21) Appl. No.: 16/767,608

(22) PCT Filed: Nov. 7, 2018

(86) PCT No.: PCT/EP2018/080414
§ 371 (c)(1),
(2) Date: May 28, 2020

(87) PCT Pub. No.: WO2019/105697
PCT Pub. Date: Jun. 6, 2019

(65) Prior Publication Data
US 2020/0292058 A1    Sep. 17, 2020

(30) Foreign Application Priority Data
Nov. 29, 2017    (DE) .......................... 10 2017 221 362

(51) Int. Cl.
*F16H 57/08*    (2006.01)
*F03D 15/00*    (2016.01)
(Continued)

(52) U.S. Cl.
CPC ........... *F16H 57/082* (2013.01); *F03D 15/00* (2016.05); *F16H 1/28* (2013.01); *F16H 57/0031* (2013.01);
(Continued)

(58) Field of Classification Search
None
See application file for complete search history.

(56) References Cited

U.S. PATENT DOCUMENTS 8,287,421 B2 * 10/2012 Ciszak .................. F16H 57/082
475/331
10,359,029 B2    7/2019 Smet
(Continued)

FOREIGN PATENT DOCUMENTS

CN    101191532 A    6/2008
CN    201714592 U    1/2011
(Continued)

*Primary Examiner* — Colby M Hansen
(74) *Attorney, Agent, or Firm* — Leydig, Voit & Mayer, Ltd.

(57) ABSTRACT

A planetary stage includes a planetary carrier, at least one pitch tube, and at least one fixing element. The pitch tube is arranged coaxially to a rotation axis of the planetary stage. The pitch tube extends through a wall of the planetary carrier. The fixing element is fixed in the wall. The pitch tube has a groove. The fixing element engages in at least one part of the groove, wherein the at least one part of the groove extends orthogonally to the rotation axis. A plate is fixed in the wall, and the fixing element engages in a clearance between the wall and the plate and is fixed positively between the wall and the plate.

5 Claims, 2 Drawing Sheets

(51) Int. Cl.
 *F16H 1/28* (2006.01)
 *F16H 57/00* (2012.01)
 *F16H 57/02* (2012.01)
(52) U.S. Cl.
 CPC . *F05B 2260/30* (2013.01); *F05B 2260/40311* (2013.01); *F16H 2057/02078* (2013.01)

(56) References Cited

U.S. PATENT DOCUMENTS

| | | | | |
|---|---|---|---|---|
| 2010/0113210 | A1* | 5/2010 | Lopez | F16H 1/2845 |
| | | | | 475/331 |
| 2012/0027596 | A1* | 2/2012 | Lopez | F03D 80/70 |
| | | | | 416/170 R |
| 2013/0130862 | A1* | 5/2013 | Sprenger | F16H 1/46 |
| | | | | 475/331 |
| 2014/0256502 | A1* | 9/2014 | Bauer | F03D 9/25 |
| | | | | 475/331 |
| 2017/0122296 | A1* | 5/2017 | Li | F03D 80/50 |

FOREIGN PATENT DOCUMENTS

| | | |
|---|---|---|
| CN | 205605796 U | 9/2016 |
| DE | 102014200674 A1 | 7/2015 |

\* cited by examiner

FIXING A PITCH TUBE

CROSS REFERENCE TO RELATED APPLICATIONS

This application is a U.S. National Stage Application under 35 U.S.C. § 371 of International Application No. PCT/EP2018/080414 filed on Nov. 7, 2018, and claims benefit to German Patent Application No. DE 10 2017 221 362.0 filed on Nov. 29, 2017. The International Application was published in German on Jun. 6, 2019 as WO 2019/105697 A1 under PCT Article 21(2).

FIELD

The invention relates to a planetary stage having a planetary carrier, at least one tube, and at least one fixing element.

BACKGROUND

In a wind turbine generator system, lines for pitch adjustment of the rotor blades must be guided axially through the transmission. A pitch tube is usually provided for this purpose. It is known from the prior art to fix the pitch tube on a rotatably mounted planetary carrier arranged on the rotor side. For axial fixing, the pitch tube forms two shoulders which form a positive connection with a cheek of the planetary carrier.

It is difficult to manufacture a tube with a shoulder. For this reason, a sleeve which forms a first shoulder is placed on the pitch tube. A securing ring which is inserted into a groove forms a second shoulder.

The pitch tube furthermore has a recess in which a fixing element engages. The fixing element is screwed to the cheek of the planetary carrier. In this way, the pitch tube is prevented from rotating relative to the planetary carrier.

Publication DE 10 2014 200 674 A1 discloses a connector for a pitch tube. The pitch tube is executed in two pieces and can be braced against an elastomer seal. Due to the shape change experienced by the elastomer seal as a result thereof, the pitch tube is fixed.

SUMMARY

In an embodiment, the present invention provides a planetary stage. The planetary stage includes a planetary carrier, at least one pitch tube, and at least one fixing element. The pitch tube is arranged coaxially to a rotation axis of the planetary stage. The pitch tube extends through a wall of the planetary carrier. The fixing element is fixed in the wall. The pitch tube has a groove. The fixing element engages in at least one part of the groove, wherein the at least one part of the groove extends orthogonally to the rotation axis. A plate is fixed in the wall, and the fixing element engages in a clearance between the wall and the plate and is fixed positively between the wall and the plate.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
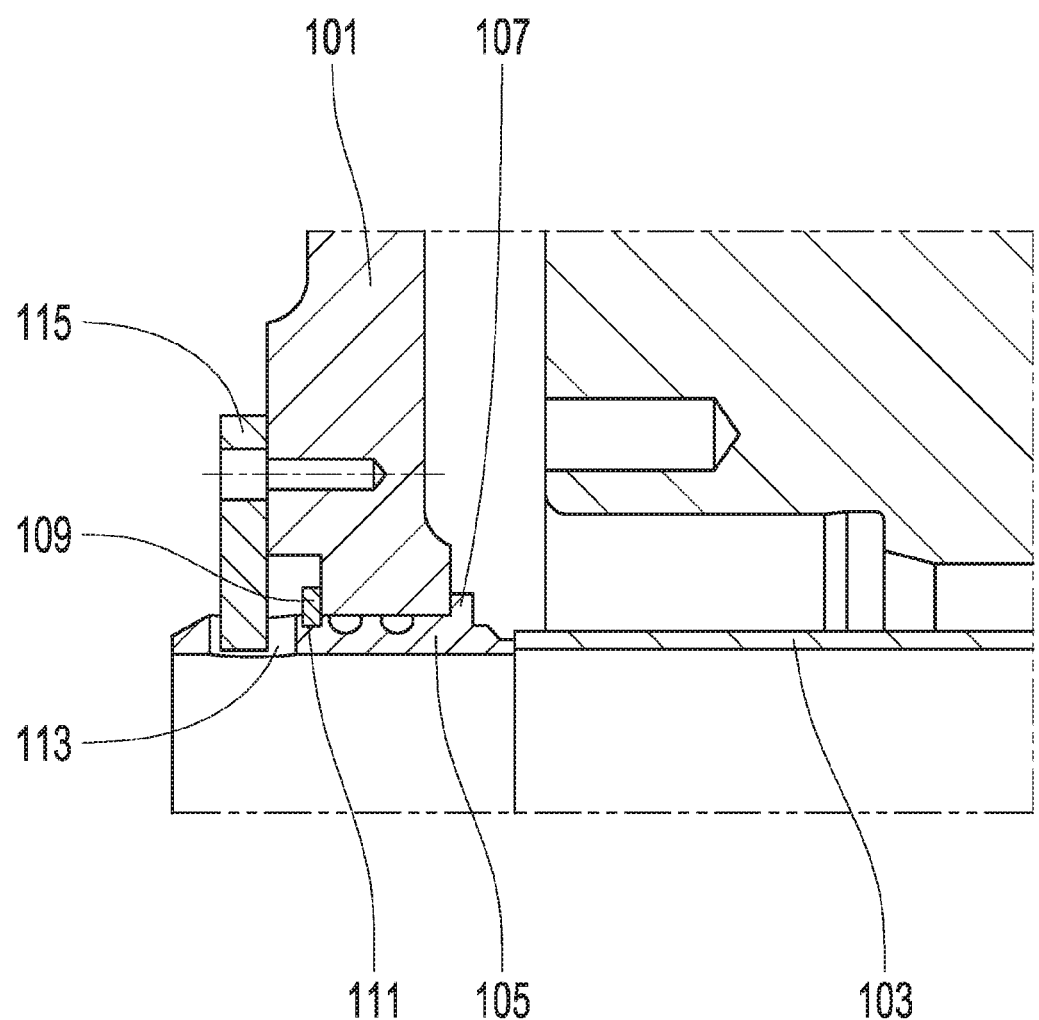
FIG. 1 illustrates a fixing of a pitch tube known from the prior art.

Embodiments of the invention provide for eliminating disadvantages inherent to the prior art. In particular, embodiments provide for a pitch tube fixed to a planetary carrier as inexpensively as possible.

A planetary stage refers to an assembly having a planetary carrier, one or more planetary gears, a ring gear, and a sun gear. The planetary gears are rotatably mounted in the planetary carrier and respectively mesh with the ring gear and/or the sun gear. Two of the three components of planetary carrier, ring gear, and sun gear are rotatably mounted. The third component cannot be rotated, or can be rotated only to a limited extent.

Planetary stages according to the disclosure preferably have a rotatably mounted planetary carrier. Furthermore, they comprise at least one tube and at least one fixing element.

A tube is a hollow body having exactly two openings and a wall which connects the openings to one another. The tube is preferably straight and has a straight central axis. In particular, the tube can be torsionally symmetrical or rotationally symmetrical with respect to the central axis. The basic shape of the tube is preferably a hollow cylinder.

The basic shape of a body generally refers to the shape of an original body from which the first-mentioned body is formed by eliminating individual regions, for example by introducing recesses. Such a recess can be a groove, for instance.

The tube of a planetary stage according to the disclosure is arranged coaxially to a rotation axis of the planetary stage. This means that the central axis of the tube and the rotation axis of the planetary stage coincide. The rotation axis of the planetary stage is a rotation axis of the two aforementioned rotatable components of the planetary stage. If the planetary carrier is of rotatable design, the central axis of the tube and the rotation axis of the planetary carrier are accordingly identical.

The tube is led through a wall of the planetary carrier. This means that the wall is arranged axially, i.e. with respect to the rotation axis of the planetary stage, between the two openings of the tube. A first opening of the tube and the wall are arranged on different sides of a first radially extending plane, i.e. a plane aligned orthogonal to the rotation axis. Accordingly, the second opening and the wall are arranged on different sides of a second radially aligned plane. The wall is located between the first plane and the second plane.

The tube serves as a pitch tube. Among experts, pitch tube refers to a conduit in a wind turbine generator system, wherein at least a part of the conduit extends at least partially through a rotor shaft of the wind turbine generator system. The rotor shaft connects a rotor having a rotor hub and wind-driven rotor blades to an input shaft of a transmission in a rotationally fixed manner. The pitch tube extends coaxially to a rotation axis of the rotor shaft or of the rotor. This means that the pitch tube is torsionally or rotationally symmetrical about an axis which is identical to the rotation axis of the rotor shaft or of the rotor. The course of the pitch tube through the rotor shaft requires that the pitch tube also extend through other transmission parts such as, in the present instance, the wall of the planetary carrier.

In order to be able to perform an adjustment of the blade setting angle (pitch control), electrical lines are required which run between the rotor and a terminal on the generator side. The pitch tube serves inter alia to pipe these lines through the rotor shaft.

The wall can in particular be a cheek of the planetary carrier. A cheek is a supporting structure in which all planetary studs of the planetary stage are fixed. The cheek and planetary gears are axially offset from one another. This implies that there is an axial clearance between the cheek and the planetary gears.

The wall preferably has a passage or a continuous hole in which a part of the tube is located. This is a part of the tube which is axially congruent with the passage. The part is located between the two openings of the tube.

The fixing element is fixed in the wall. The fixing preferably takes place in an axially non-displaceable manner, i.e. in such a way that displacements of the fixing element relative to the wall are limited by the fixing. In particular, the fixing element can be rigidly fixed in the wall. In this instance, the fixing prevents any movements of the fixing element relative to the wall.

The tube has a first groove. A groove is an elongated depression of a surface, in the present instance a shell surface of a tube. Compared to other types of depressions of a surface, a groove is characterized by a cross section which is invariant along the course of the groove. The cross section is invariant with respect to a section plane oriented orthogonally to a curve describing the course of the groove.

The fixing element engages in at least a part of the first groove. Thus, at least a part of the fixing element is located in the at least one part of the first groove.

According to the disclosure, the at least one part of the first groove runs orthogonally to the rotation axis of the planetary stage. The curve which describes the course of the groove runs in the at least one part correspondingly within a radially aligned plane.

In that the fixing element engages in the at least one part of the first groove, a positive connection occurs between the fixing element and the first groove and, as a result, between the fixing element and the tube. Since the at least one part of the first groove is oriented orthogonally to the rotation axis, this fixing acts in the axial direction and thus prevents axial displacement of the tube and the fixing element relative to one another. Since the fixing element is fixed in the wall, the axial position of the tube relative to the wall is also fixed as a result.

Compared to the achievements known from the prior art, the disclosure describes a particularly simple fixing of the tube. It is not necessary to provide the tube with additional elements, for instance a sleeve.

In a preferred further development, the first groove surrounds the rotation axis of the planetary stage. This means that the first groove is self-contained and extends around the rotation axis. In particular, the first groove can be torsionally symmetrical or rotationally symmetrical with respect to the rotation axis.

Since the fixing element engages in the first groove, the shape of the fixing element must correspond to the shape of the first groove. Accordingly, the fixing element preferably has a torsionally symmetrical or rotationally symmetrical basic shape. In particular, the basic shape of the fixing element can be a ring.

In a further preferred development, the planetary carrier is rotatably mounted. The tube is thereby fixed to the planetary carrier in a rotationally secure manner.

The fixing of the fixing element of the wall is a direct fixing. This means that there is either a positive fit between the fixing element and the wall, or the fixing is produced exclusively by means provided for this purpose, for instance screws or rivets. Accordingly, the fixing element can be screwed or riveted to the wall.

However, the planetary stage is preferably further developed with a plate which is fixed to the wall. The plate serves to fix the fixing element positively in the wall. For this purpose, the fixing element forms a clearance with the wall. The clearance is preferably in the form of a groove. The fixing element engages in the clearance so that it is positively fixed between the wall and the plate. The clearance preferably runs orthogonally, in particular rotationally symmetrically, relative to the rotation axis. An axial fixing of the fixing element occurs in this way.

The tube can have a recess for fixing in the planetary carrier in a rotationally secure manner. The fixing element or the plate described further below forms a lug which engages in the recess. In this way, a positive connection is produced between the lug and the recess, and thus between the lug and the tube, which fixes the tube in a rotationally secure manner.

A single-piece fixing element that extends around the rotation axis and is self-contained might not be mounted without further measures so as to engage in the groove. One possibility of achieving this would be a gap which allows the fixing element to expand radially. The gap extends radially and in a circumferential direction. The course of the fixing element around the rotation axis is interrupted by the gap. Such a fixing element is also referred to as snap ring.

Alternatively, in a preferred development the fixing element is designed in at least two pieces. Each piece can be inserted separately into the groove. In the inserted state, the fixing element according to the development surrounds the rotation axis, i.e. extends completely around the rotation axis. The wall and/or the plate serve to radially fix the individual pieces of the fixing element.

Figure 2:
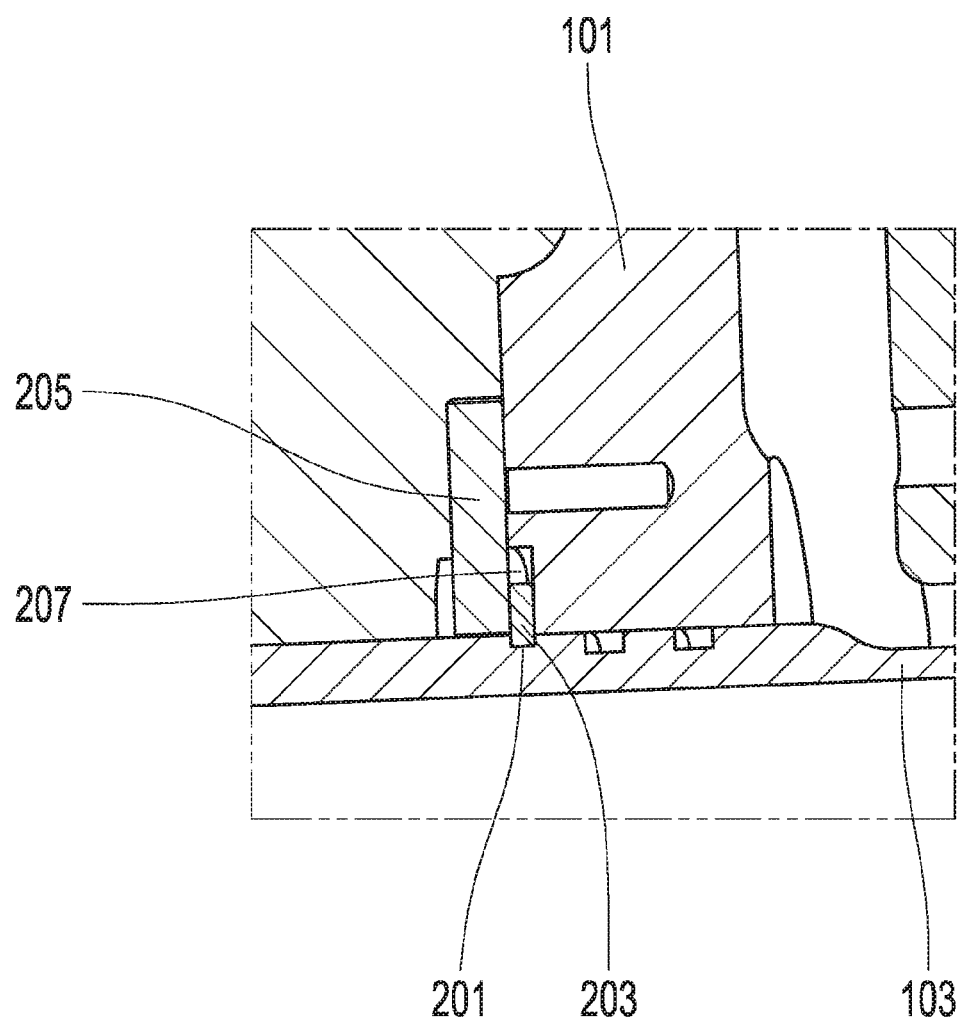
FIG. 2 illustrates a simplified fixing of the pitch tube.

An arrangement known from the prior art is shown in FIG. 1. FIG. 2 reproduces a preferred exemplary embodiment. Here matching reference numbers indicate identical or functionally identical features.

The illustrations in FIGS. 1 and 2 each show a cutout of a transmission of a wind turbine generator system. Shown are a cheek 101 of a rotatably mounted planetary carrier and a pitch tube 103 which is fixed in a rotationally secure manner in the planetary carrier or in the cheek 103 thereof.

The planetary carrier is part of a planetary stage, which moreover includes a sun gear, a ring gear, and a plurality of planetary gears. The planetary gears are each rotatably mounted on a planet pin fixed in the cheek 101. Each planetary gear meshes with the ring gear and the sun gear.

Further planetary stages and/or spur gear stages can be connected downstream and/or upstream of the planetary stage. The drive is effected via a rotor which is connected in a rotationally secure manner to the planetary carrier, or to a rotatable component of an optional upstream planetary stage. A sun shaft connected in a rotationally secure manner to the sun gear serves as output. The sun shaft drives a downstream planetary or spur gear stage, or is connected in a rotationally secure manner to a rotor of a generator.

The assemblies shown in FIGS. 1 and 2 differ with respect to the fixing of the pitch tube 103 in the cheek 101 of the planetary carrier. According to FIG. 1, a sleeve 105 is placed on the pitch tube 103. The sleeve 105 forms a shoulder 107 which bears against the cheek 101 of the planetary carrier. A snap ring 109 rests on a side of the cheek 101 of the planetary carrier opposite the shoulder 107. The snap ring 109 is inserted into a groove 111 of the sleeve 105. In this way, the pitch tube 103 is axially fixed.

In order to prevent the pitch tube 103 from twisting relative to the planetary carrier, it has a recess 113. A securing strap 115, which is screwed to the cheek 101 of the planetary carrier, engages in the recess 113.

According to the achievement shown in FIG. 2, the pitch tube 103 is provided with a groove 201. A ring 203 engages in the groove 201. The ring 203 is in turn fixed in the cheek 101 of the planetary carrier. In this way, the pitch tube 103 is fixed. The sleeve 105 can be omitted.

Via the groove 201, a positive connection exists between the ring 203 and the pitch tube 103. In order to also establish a positive connection between the ring 203 and the cheek 101 of the planetary carrier, a plate 205 is provided which is screwed to the cheek 101.

The ring 203 is located between the plate 205 and the cheek 101. Thus, the axial mobility of the ring is limited in one direction by the plate and in the opposite direction by the cheek 101 of the planetary carrier. The cheek 101 of the planetary carrier has a depression 207 running around the pitch tube 103 for receiving the ring 203. The depression 207 is covered by the plate 205. Together with the groove 201, the depression 207 forms a closed cavity in which the ring 203 is located.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

101 Cheek of a planetary carrier
103 Pitch tube
105 Sleeve
107 Shoulder
109 Snap ring
111 Groove
113 Recess
201 Groove
203 Ring
205 Plate
207 Depression

The invention claimed is:

1. A planetary stage, comprising:
a planetary carrier,
at least one pitch tube; and
at least one fixing element,
wherein the pitch tube is arranged coaxially to a rotation axis of the planetary stage,
wherein the pitch tube extends through a wall of the planetary carrier,
wherein the fixing element is fixed in the wall,
wherein the pitch tube has a groove,
wherein the fixing element engages in at least one part of the groove,
wherein the at least one part of the groove extends orthogonally to the rotation axis,
wherein a plate is fixed in the wall, and
wherein the fixing element engages in a clearance between the wall and the plate and is fixed positively between the wall and the plate.

2. The planetary stage according to claim 1, wherein the groove surrounds the rotation axis.

3. The planetary stage according to claim 1, wherein the planetary carrier is rotatably mounted, and
wherein the pitch tube is fixed in a rotationally secure manner in the planetary carrier.

4. The planetary stage according to claim 1 wherein the pitch tube has a recess,
wherein the fixing element or the plate forms a lug, and
wherein the lug engages in the recess.

5. The planetary stage according to claim 1, wherein the fixing element is designed in at least two pieces.

* * * * *